United States Patent [19]
Andoh

[11] Patent Number: 6,141,306
[45] Date of Patent: Oct. 31, 2000

[54] OPTICAL DISC DRIVE AND METHODS OF EXAMINING THE OPTICAL DISC DRIVE

[75] Inventor: Junichi Andoh, Chofu, Japan

[73] Assignee: Mitsumi Electric Co., Ltd., Tokyo, Japan

[21] Appl. No.: 09/162,969

[22] Filed: Sep. 29, 1998

[30] Foreign Application Priority Data

Sep. 30, 1997 [JP] Japan ................................. 9-283072

[51] Int. Cl.[7] ..................................................... G11B 7/00
[52] U.S. Cl. ................................. 369/54; 369/50; 369/59
[58] Field of Search ................................ 369/47, 48, 49, 369/50, 54, 58, 59, 32, 44.13, 44.26

[56] References Cited

U.S. PATENT DOCUMENTS

| | | |
|---|---|---|
| 5,553,042 | 9/1996 | Usui . |
| 5,815,475 | 9/1998 | Igarashi et al. ............................ 369/47 |
| 6,034,936 | 3/2000 | Ogawa et al. ............................ 369/58 |
| 6,061,313 | 5/2000 | Shigemori ................................. 369/47 |

*Primary Examiner*—Muhammad Edun
*Attorney, Agent, or Firm*—Patents +TMS, P.C.

[57] ABSTRACT

An optical disc drive for recording and playing back a recordable-type optical disc includes a driving mechanism for rotating the optical disc, an optical pick-up for writing and reading data to and from the optical disc, signal processor for processing signals read out from the optical disc by means of the optical pick-up, a CPU for controlling the driving mechanism, the optical pick-up and the signal processor. The optical disc drive is further equipped with a detecting device for detecting an ATIP error and a counter for counting the number of ATIP errors. The optical disc drive counts the number of ATIP errors caused in a predetermined time based on the synchronization signal (SUBCODE-SYNC) produced by a clock provided in the optical disc drive after the synchronization signal (SUBCODE-SYNC) has been synchronized with a synchronization signal (ATIP-SYNC) obtained from a reference optical disc. The recording performance of the optical disc is examined based on the counted number of the detected ATIP errors.

11 Claims, 18 Drawing Sheets

FIG. 8

FRAME FORMAT OF 1 ATIP FRAME (42Bits 1/75sec)

| NUMBER OF BITS | 4 | 8 | 8 | 8 | 14 |
|---|---|---|---|---|---|
| BIT POSITION | 1234 | 111<br>56789012 | 11111112<br>34567890 | 22222222<br>12345678 | 23333333333444<br>90123456789012 |
| DATA | Sync | Min | Sec | Frame | Error Detection Code |

FIG. 14

Q DATA 96Bits FORMAT

| Q1~Q4 | Q5~Q8 | Q9............Q80 | Q81............Q96 |
|---|---|---|---|
| CONTROL | ADDRESS | DATA 72Bits | CRC 16Bits |

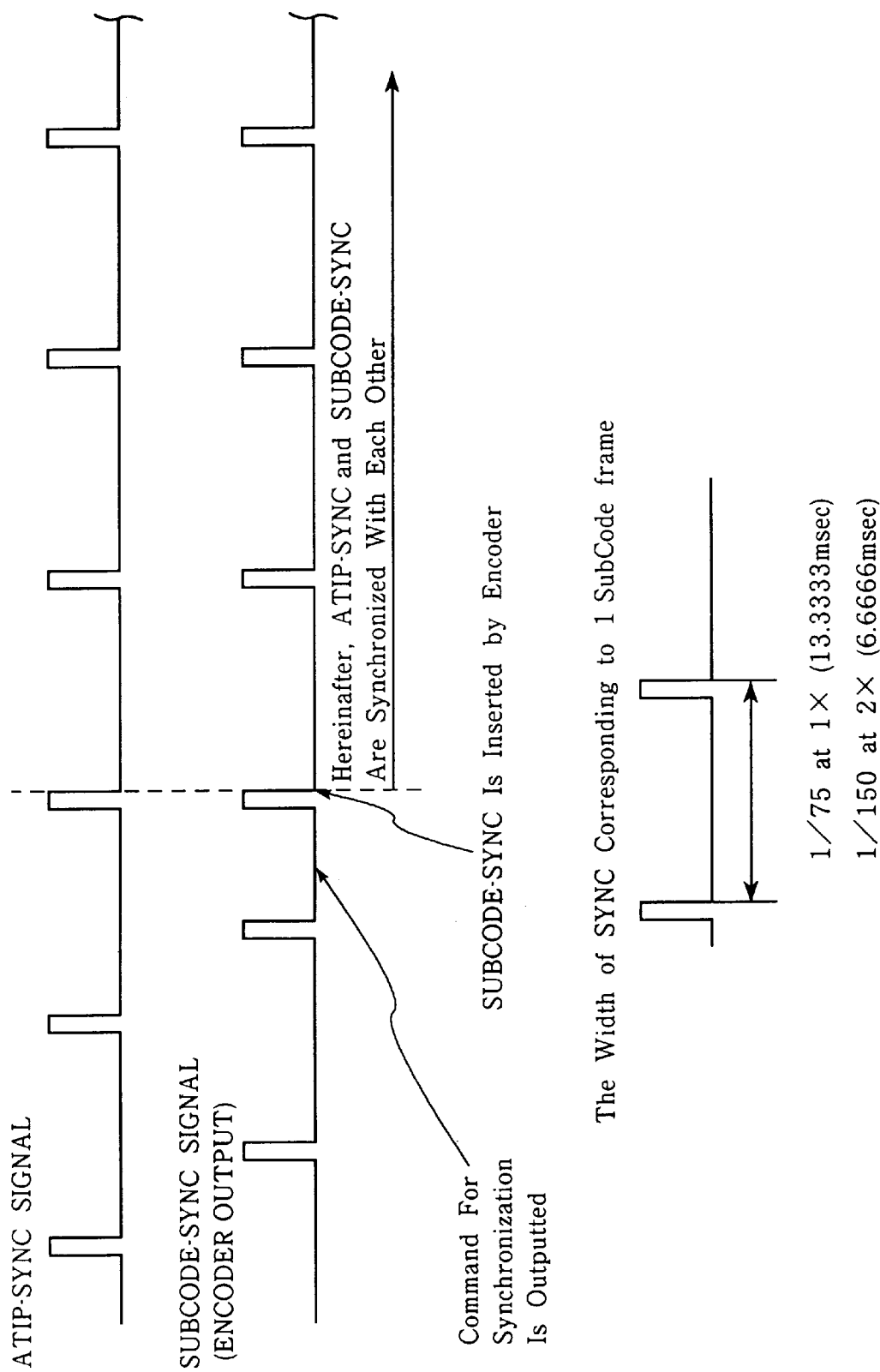

OPTICAL DISC DRIVE AND METHODS OF EXAMINING THE OPTICAL DISC DRIVE

BACKGROUND OF THE INVENTION

1. Field of the Invention

This invention relates to an optical disc drive for playing back or recording and playing back an optical disc and a method of examining the optical disc drive.

2. Description of the Prior Art

There are known optical disc drives for recording and playing back a recordable-type optical disc such as a CD-R (CD-Recordable), examples of which include CD-R drives.

In optical disc drives such as CD-R drives, data is newly written onto an optical disc. Therefore, in such optical disc drives, an examination or inspection for checking a writing performance of the optical disc drive and a condition of the written data (as to whether the written data satisfies the required standard or not) is carried out. In the case of CD-R drives, such an examination is carried out by counting (measuring) the number of ATIP (Absolute Time In Pregroove) errors during manufacturing process thereof or at the time when the drives are repaired. Here, the ATIP error means an error in the ATIP information which is previously recorded in an optical disc in the form of pre-groove (WOBBLE), and the number of ATIP errors means the number that could not acquire ATIP time information within a predetermined time at the time when WOBBLE is being reproduced. For example, in the case where the number of ATIP errors caused within a predetermined period exceeds a predetermined reference value, a determination is made that the optical disc drive is abnormal.

Conventionally, an error rate counter which is a separate external device is connected to the optical disc drive for counting the number of ATIP errors.

However, in order to connect such an externally installed error rate counter to the optical device, it is necessary for the optical disc drive to additionally provide a connector for connecting the error rate counter. In order to provide such a connector to the optical device, it is required to disassemble the optical disc drive, thus leading to a problem in that such disassembling operation and subsequent assembling operation are quite troublesome.

In addition, when the number of ATIP errors is counted during the manufacturing process, it is necessary to install the error rate counter for counting the number of ATIP errors in the assembly line, thus leading to another problem in that equipments of the assembly line increase.

SUMMARY OF THE INVENTION

It is an object of the present invention to provide an optical disc drive which can easily count the number of ATIP errors and a method of examining an optical disc drive.

In order to achieve the object, the present invention is directed to an optical disc drive for recording and playing back an recordable-type optical disc, which comprises a driving mechanism for rotating the optical disc; a optical pick-up for writing and reading data to and from the optical disc; signal processing means for processing signals read out from the optical disc by means of the optical pick-up; control means for controlling at least the driving mechanism, the optical pick-up and the signal processing means; detecting means for detecting an ATIP error; and counting means for counting the number of ATIP errors.

According to the optical disc drive of the present invention, since both the detecting means for detecting an ATIP error and the counting means for counting the number of ATIP errors are provided within the optical disc drive, it is not necessary to separately provide an error rate counter in the assembly line, which enables to easily examine the recording performance of the optical disc drive and simplify the equipments in the assembly line.

In the present invention, it is preferred that the optical disc drive further comprises a memory for storing the counted value of the ATIP errors.

Further, it is also preferred that the detecting means is provided in the signal processing means, and the counting means is provided in the controlling means.

Furthermore, it is also preferred that the optical disc drive further comprises transmitting means for transmitting the counted value of the ATIP errors or information obtained from the counted value to a computer.

Moreover, it is also preferred that the optical disc has a pre-groove for generating a first synchronization signal and the optical disc drive has means for generating a second synchronization signal, in which the counting means counts the number of ATIP errors caused in a predetermined time based on the second synchronization signal after the second synchronization signal has been synchronized with the first synchronization signal. Preferably, the second synchronization signal is produced by a clock provided in the optical disc drive.

This makes it possible to count the number of ATIP errors more accurately. Namely, in the case of the synchronization signal from the optical disc, there is a case that such a signal can not be acquired from the disc due to its defect or the like. However, use of the synchronization signal generated by the clock provided in the optical disc can avoid such a problem, and this makes it possible to measure a predetermined time for counting the number of ATIP errors (sampling period) more accurately.

Another aspect of the present invention is directed to a method of examining an optical disc drive for recording and playing back a recordable-type optical disc. The method comprises the steps of preparing an optical disc drive having detecting means for detecting an ATIP error and counting means for counting the number of ATIP errors; loading a reference optical disc which has substantially no defects to the optical disc drive; driving the optical disc; counting the number of ATIP errors by means of the detecting means and the counting means of the optical disc drive; and examining the recording performance of the optical disc drive based on the counted number of the detected ATIP errors.

In this method, it is preferred that the optical disc drive is connected to a computer having a monitor, and the counted number of the detected ATIP errors is displayed on the monitor.

Further, it is also preferred that the optical disc has a pre-groove for generating a first synchronization signal and the optical disc drive has means for generating a second synchronization signal, in which the counting means counts the number of ATIP errors caused in a predetermined time based on the second synchronization signal after the second synchronization signal has been synchronized with the first synchronization signal. Preferably, the second synchronization signal is produced by a clock provided in the optical disc drive.

Other objects, structures and advantages of the present invention will be apparent when the following description of the preferred embodiment is considered taken in conjunction with the accompanying drawings.

BRIEF DESCRIPTION OF THE DRAWINGS

FIG. 8 is a chart which shows a format of an ATIP frame.

FIG. 14 is a drawing which shows a format of the Q data of 96 bits.

FIG. 18 is a timing chart which shows the ATIP-SYNC signal and the SUBCODE-SYNC signal from the SYNC signal generating/ATIP decoder in the optical disc drive according to the present invention.

DETAILED DESCRIPTION OF THE PREFERRED EMBODIMENTS

With reference to the appended drawings, a detailed description will now be given for the preferred embodiments of an optical disc drive and a method of examining an optical disc drive according to the present invention.

Figure 1:
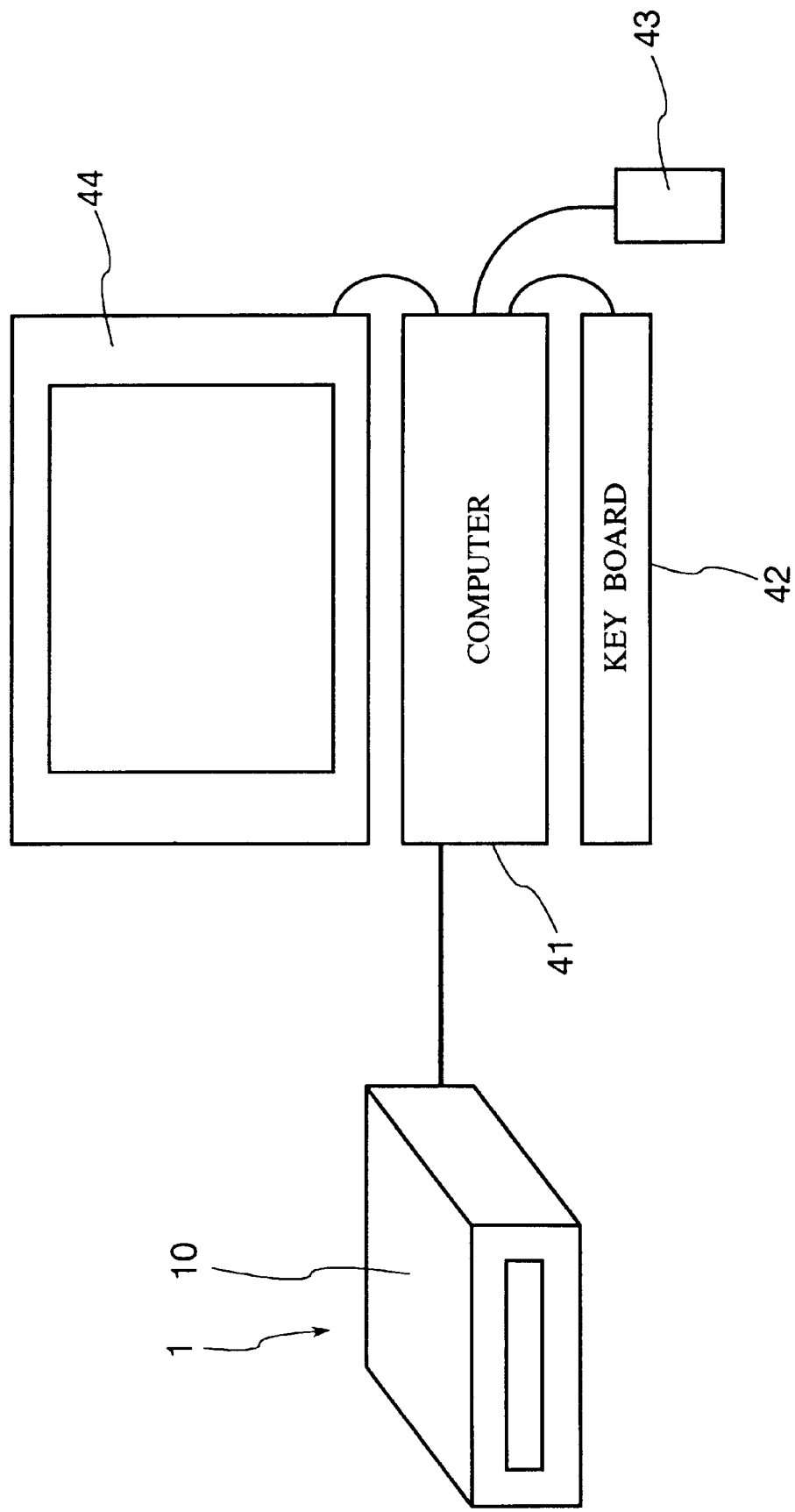
FIG. 1 is an illustration which shows a state that the optical disc drive according to the present invention is connected to an computer.
Figure 2:
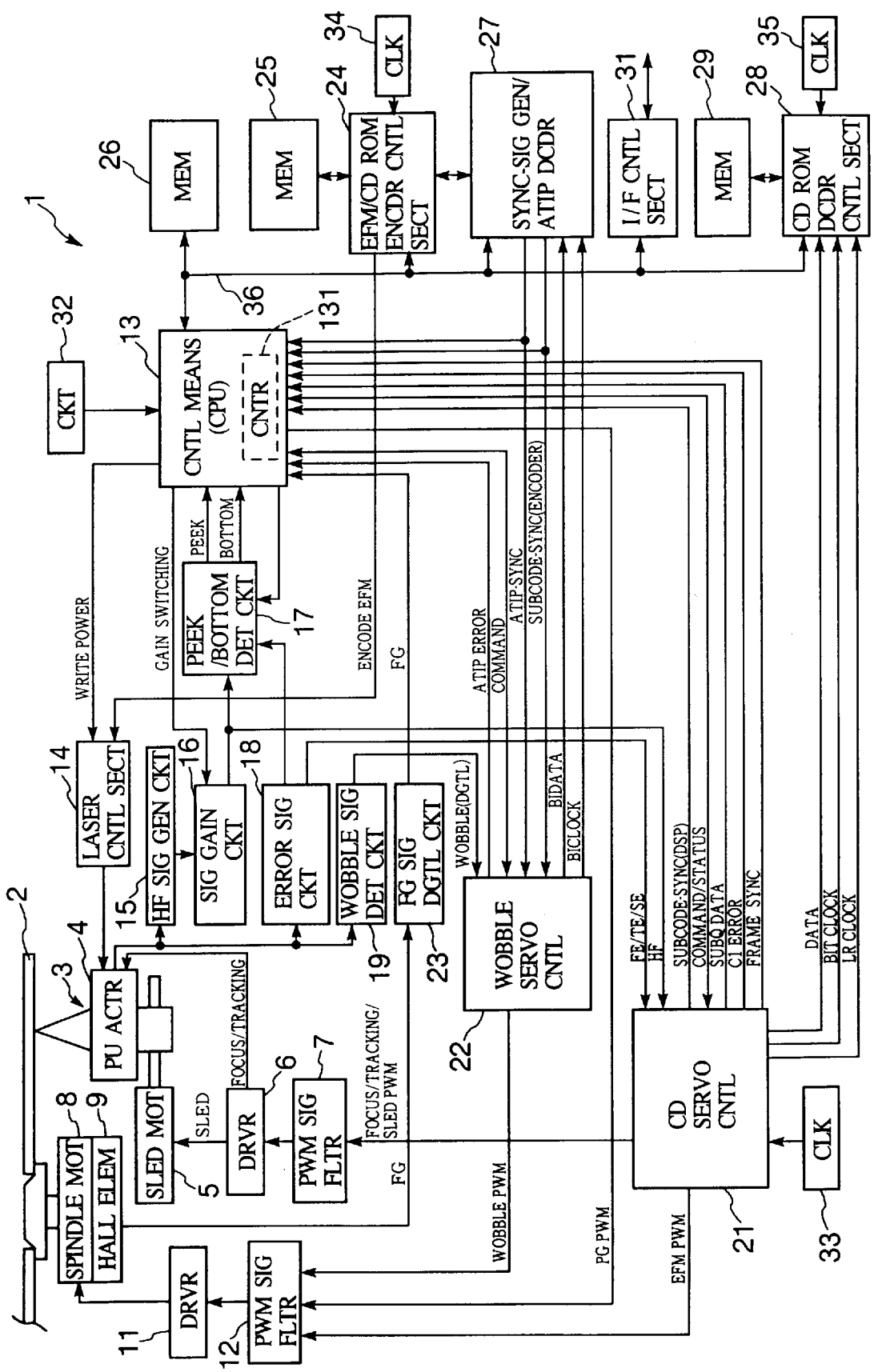
FIG. 2 is a block diagram which shows an embodiment of the optical disc drive according to the present invention.

FIG. 1 is an illustration which shows an optical disc drive 1 of the present invention in a connected state with a computer, and FIG. 2 is a block diagram which shows an embodiment of the optical disc drive 1 of the present invention.

The optical disc drive 1 shown in these drawings is a CD-R drive for recording and playing back an optical disc (CD-R) 2.

In the optical disc 2, there is formed a spiral pre-groove (WOBBLE) which is not shown in the drawing.

The pre-groove meanders at a predetermined period (22.05 kHz at the reference rotation speed (1×)), and ATIP (Absolute Time in Pre-groove) information (time information) is previously recorded with the Pre-groove. The ATIP information is recorded by being biphase modulated and frequency-modulated at a carrier frequency of 22.05 kHz.

The Pre-groove functions as a guide groove when forming pits and lands (recording pits and lands) for the optical disc 2. Further, the information recorded by the pre-groove is reproduced and then utilized to control the rotation speed of the optical disc 2 and specify a recording position (absolute time) on the optical disc 2.

The optical disc drive 1 is equipped with a turntable and a spindle motor 8 for rotating the turntable, and includes a rotation driving mechanism (not shown in the drawings) for rotating the turntable when the optical disc is loaded thereon. Further, a Hall element 9 is arranged near the spindle motor 8.

Further, the optical disc drive 1 includes an optical head (hereinafter, referred to as "optical pick-up") 3 capable of movement along the radial direction of the loaded optical disc 2 (i.e., along a radial direction of the turntable); an optical pick-up moving mechanism (not shown in the drawings) equipped with a sled motor 5 to move the optical pick-up 3, that is an optical pick-up base of the optical pick-up 3 along a radial direction of the turntable; drivers 6 and 11; a PWM signal smoothing filters 7 and 12; control means 13;

a laser control section 14; an HF signal generating circuit 15; an gain switching circuit 16; a peak/bottom detection circuit 17; an error signal generating circuit 18; a WOBBLE signal detection circuit 19; a CD servo controller 21; a WOBBLE servo controller 22; a FG signal digitization circuit 23; an EFM/CD-ROM encoder control section 24; memories 25, 26 and 29; a SYNC signal generating/ATIP decoder 27; a CD-ROM decoder control section 28; an interface control section 31; clocks 32, 33, 34 and 35; and a casing 10 which houses all these elements. Hereinbelow, the radial direction of the optical disc 2 along which the optical pick-up 3 is capable of moving will simply be referred to as the "radial direction."

The optical pick-up 3 includes (but not shown in the drawings) an optical pick-up base equipped with a laser diode (light source) and a photodiode (light-receiving element), and an objective lens (converging lens). The operation of the laser diode is controlled by the laser control section 14.

The objective lens is supported by suspension springs provided on the pick-up base and can be moved, with respect to the pick-up base, along the radial direction and the rotational axial direction of the optical disc 2 (i.e., the axial direction of the turntable). In this way, if the objective lens is shifted from its neutral position (central position), the restoring force of the suspension springs will bias the objective lens toward the neutral position. Hereinbelow, the rotational axial direction of the optical disc 2 will simply be referred to as the axial direction".

Further, the optical pick-up 3 includes an actuator 4 to move the objective lens respectively in the radial direction and the axial direction with respect to the pick-up base.

The control means 13 is generally constructed from a microcomputer (CPU), and it carries out control of the entire optical disc drive 1, including control of the optical pick-up 3 (actuator 4), sled motor 5, spindle motor 8, laser control section14, HF signal gain switching circuit 16, peak/bottom detection circuit 17, CD servo controller 21, WOBBLE servo controller 22, EFM/CD-ROM encoder control section 24, memories 25, 26 and 29, SYNC signal generating/ATIP decoder 27, CD-ROM decoder control section 28, interface control section 31 and the like.

Further, addresses, data, commands and the like from the control means 13 are inputted via an address/data bus 36 to the EFM/CD-ROM encoder control section 24, memory 26, SYNC signal generating/ATIP decoder 27, CD-ROM decoder control section 28, interface control section 31 and the like.

An separate apparatus (in the present embodiment, a computer 41) can be freely connected to (and disconnected from) the optical disc drive 1 via the interface control section 31, and this makes it possible for the optical disc drive 1 and the computer 41 to communicate with each other.

As for the interface control portion 31, it is possible, for example, to use an ATAPI (IDE) (ATAPI Standard), SCSI (SCSI Standard) or the like.

A keyboard 42, a mouse 43 and a monitor 44 are connected to the computer 41.

In this regard, it is to be noted that the interface control section 31 constitutes a transmission means of the present invention.

Further, the HF signal generating circuit 15, the HF signal gain switching circuit 16, the peak/bottom detection circuit 17, the error signal generating circuit 18, the WOBBLE signal detection circuit 19, the CD servo controller 21 and the WOBBLE servo controller 22 constitute a signal processing means.

Next, the operation of the optical disc drive 1 will be described.

While carrying out focus control, tracking control, sled control and rotation control (rotation speed control), the optical disc drive 1 records (writes in) and plays back (read out) information (data) to and from a predetermined track of the optical disc 2. Hereinbelow, the operations carried out during (1) recording, (2) playback, (3) focus control, tracking control and sled control, and (4) rotation control (rotation speed control) will be described in this order.

First, as shown in FIG. 2, a predetermined COMMAND signal from the control means 13 is inputted into the CD servo controller 21. Further, a predetermined COMMAND signal from the control means 13 is inputted into the WOBBLE servo controller 22.

These COMMAND signals transmitted from the control means 13 to the CD servo controller 21 and the WOBBLE servo controller 22 are signals indicating predetermined commands (e.g., to start controls and the like).

Then, a predetermined STATUS signal from the CD servo controller 21 is inputted into the control means 13. Further, a predetermined STATUS signal from the WOBBLE servo controller 22 is also inputted into the control means 13.

These STATUS signals are in response to the commands mentioned above, namely, such status signals indicate the statuses for the controls mentioned above (e.g., control success, control failure, control being carried out and other statuses).

(1) Recording

When data (signals) is to be recorded (written in) in the optical disc 2, the pre-groove formed in the optical disc 2 is reproduced (read out), after which the data is recorded in accordance with the pre-groove.

When the data (signals) to be recorded on the optical disc 2 is inputted into the optical disc drive 1 via the interface control section 31, such data is inputted into the EFM/CD-ROM encoder control section 24.

In the EFM/CD-ROM encoder control section 24, such data is encoded in response to a clock signal (i.e., at the timing of the clock signal) from the clock 34 and then undergoes modulation (EFM modulation) by a modulation method known as EFM (Eight to Fourteen Modulation) to form ENCODE EFM signals.

Figure 3:
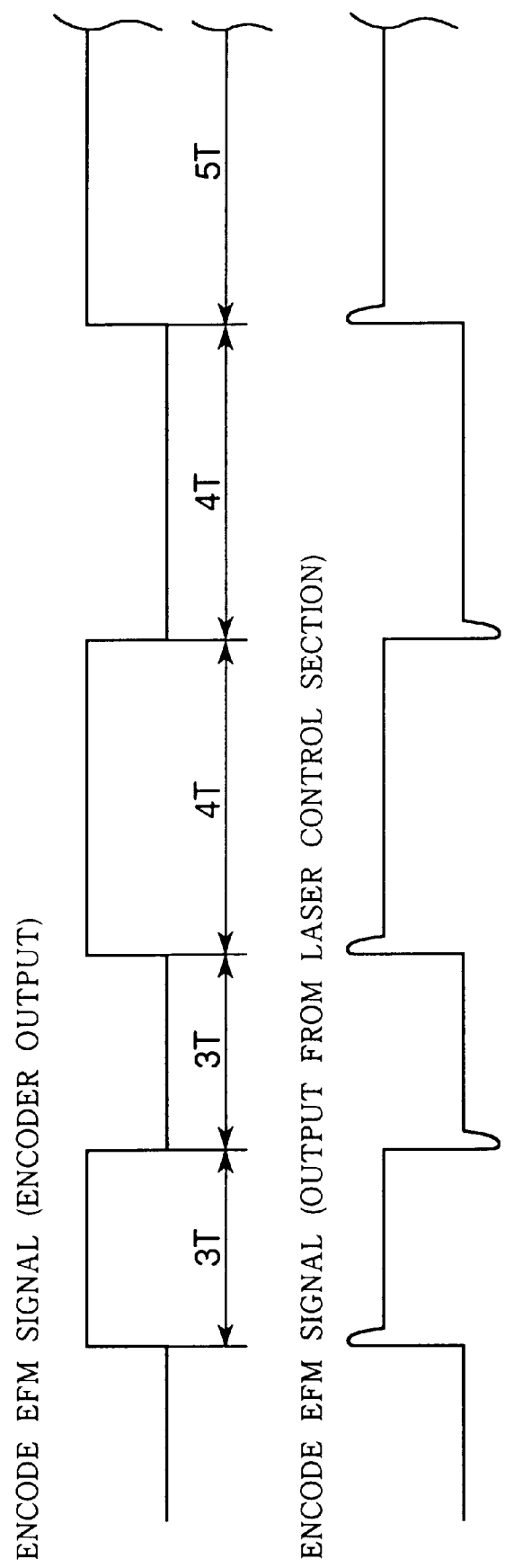
FIG. 3 is a timing chart which shows the ENCODE EFM signal from the EFM/CDROM encoder and the ENCODE EFM signal from the laser control section in the optical disc drive according to the present invention.

As shown in FIG. 3, these ENCODE EFM signals are formed from pulses each having a predetermined length (period) of any one of 3T–11T.

Figure 4:
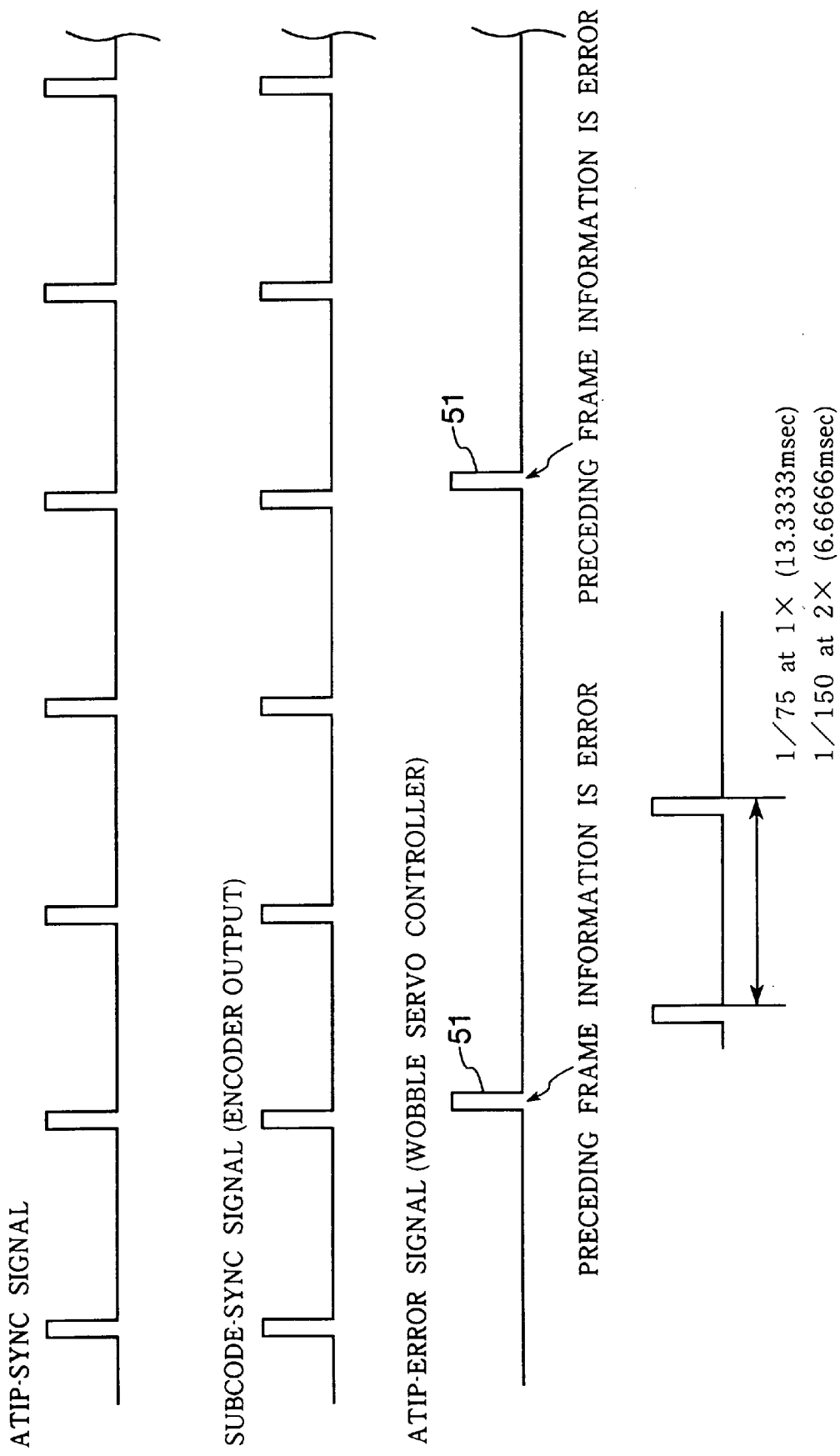
FIG. 4 is a timing chart which shows the ATIP-SYNC signal, the SUBCODE-SYNC signal from the SYNC signal generating/ATIP decoder and the ATIP error signal in the optical disc drive according to the present invention.
Figure 5:
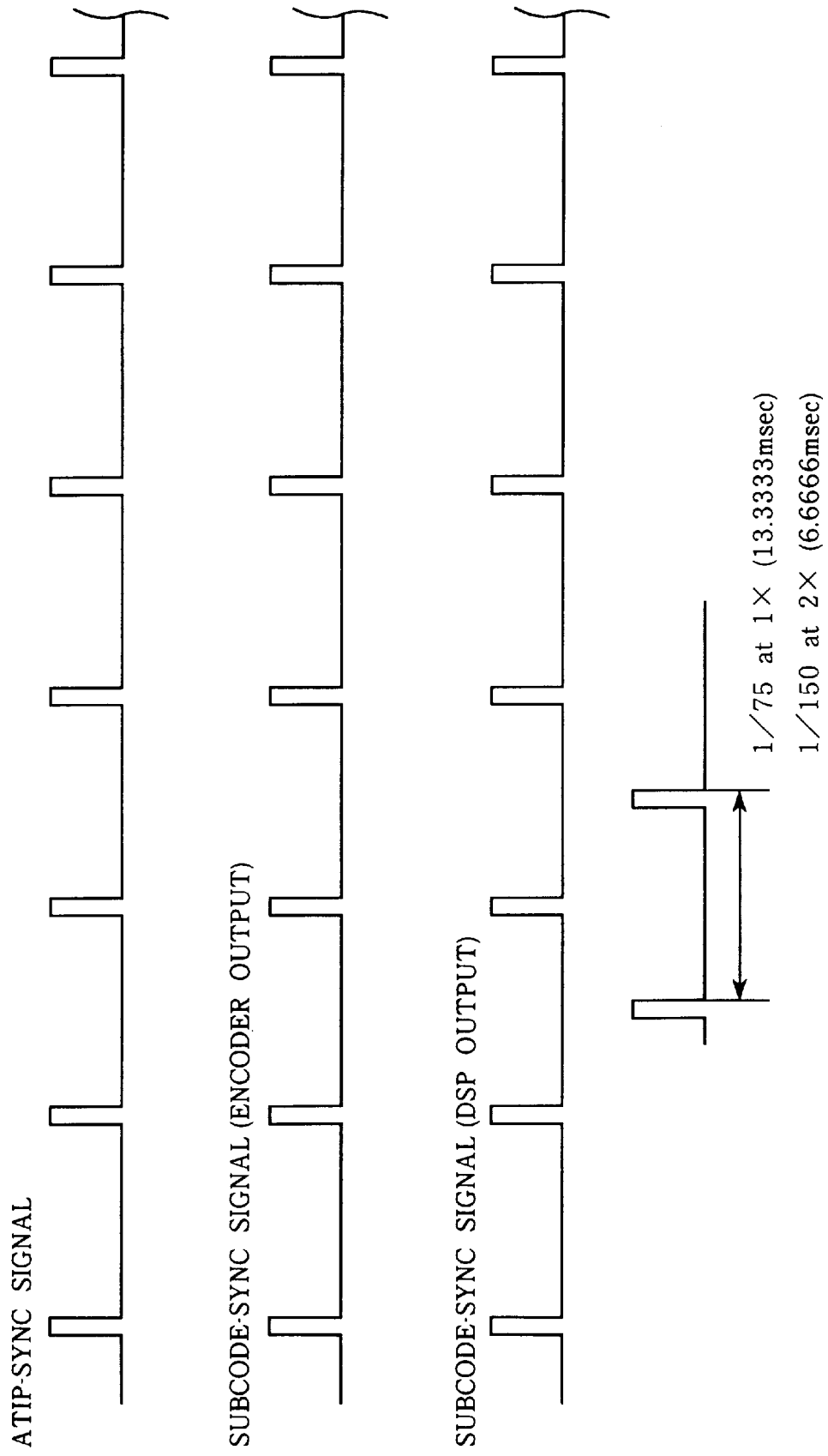
FIG. 5 is a timing chart which shows the ATIP-SYNC signal, the SUBCODE-SYNC signal from the SYNC signal generating/ATIP decoder and the SUBCODE-SYNC signal from the CD servo controller in the optical disc drive according to the present invention.

Further, as shown in FIGS. 4 and 5, in the EFM/CD-ROM encoder control section 24, the clock signal from the clock 34 is divided, and a SUBCODE-SYNC signal formed by a predetermined period pulse is generated. The pulse period of this SUBCODE-SYNC signal (i.e., the time interval between adjacent pulses) is $1/75$ second for the case of the reference rotation speed (1×).

During the encoding described above, a synchronizing signal, namely, a SYNC pattern is added to the ENCODE EFM signal based on the SUBCODE-SYNC signal (i.e., on the timing of the SUBCODE-SYNC signal). Namely, a SYNC pattern is respectively added to the portion corresponding to the head portion of each SUBCODE frame.

This ENCODE EFM signal is inputted into the laser control section 14 from the EFM/CD-ROM encoder control section 24.

Further, an analog WRITE POWER signal (voltage) is outputted from a D/A converter (not shown in the drawings) in the control means 13 and it is then inputted into the laser control section 14.

Based on the ENCODE EFM signal, the laser control section 14 switches the level of the WRITE POWER signal from the control means 13 to a high level (H) or a low level (L), and then outputs such signal, thereby controlling the operations of the laser diode of the optical pick-up 3.

In particular, during the period of time in which the ENCODE EFM signal is in a high (H) level, the laser control section 14 outputs a high level (H) WRITE POWER signal. Namely, the laser output is increased (to a level for writing in data). Then, during the period of time in which the ENCODE EFM signal is in a low (L) level, the laser control section 14 outputs a low level (L) WRITE POWER signal. Namely, the laser output is decreased (returned to a level for reading out data).

Thus, when the ENCODE EFM signal level is in the high (H) level, a pit having a predetermined length is formed in the optical disc 2, and when the ENCODE EFM signal level is in the low (L) level, a land having a predetermined length is formed in the optical disc 2.

In this way, data is written (recorded) in a predetermined track of the optical disc 2 with thus formed pits and lands.

In the EFM/CD-ROM encoder control section 24, a predetermined ENCODE EFM signal (random EFM signal) is generated in addition to the above-mentioned ENCODE EFM signal. This random EFM signal is used for output adjustment (power control) of the laser when trial writing in a test area is carried out under OPC (Optimum Power Control) procedure.

When trial writing in a test area under the OPC procedure, the random EFM signal is inputted into the laser control section 14 from the EFM/CD-ROM encoder control section 24.

Further, when trial writing is carried out in a test area during the OPC procedure, 15-step level WRITE POWER signals are generated in the control means 13, and these WRITE POWER signals are outputted from the D/A converter (not shown in the drawings) provided in the control means 13 and then inputted into the laser control section 14.

Then, based on the random EFM signal, the laser control section 14 switches the level of the WRITE POWER signals from the control means 13 to a high level (H) or a low level (L) and then outputs such signals, thereby controlling the operations of the laser diode of the optical pick-up 3. This is done for each of the 15-step level WRITE POWER signals.

In this way, in the OPC procedure, trial writing in a test area can be carried out with laser light having a 15-step output levels.

Further, when writing data in the optical disc 2, laser light at a read-out output level is emitted from the laser diode of the optical pick-up 3 onto the pre-groove of the optical disc 2, and the light reflected therefrom is received by the split photodiode of the optical pick-up 3.

Figure 6:
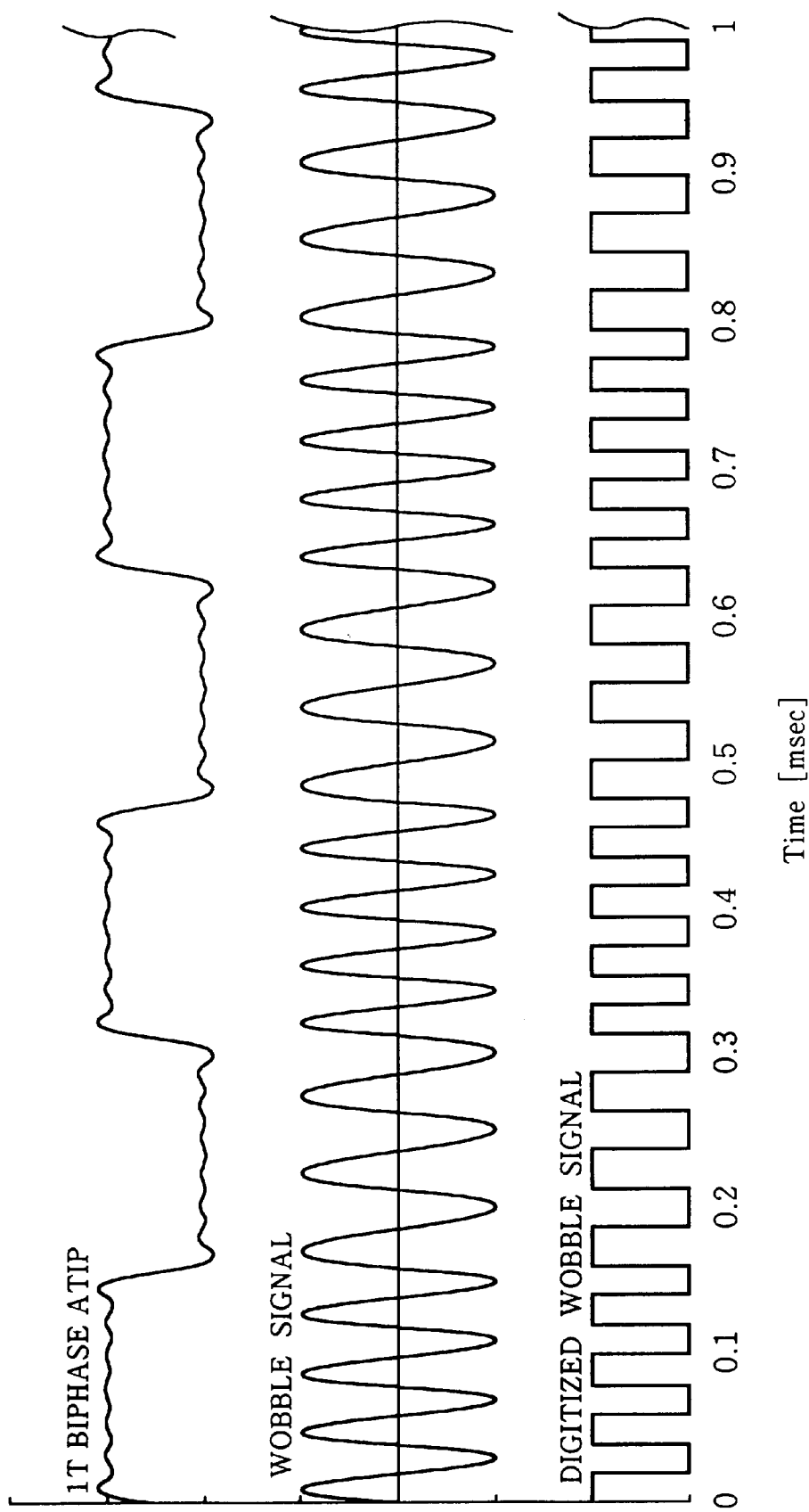
FIG. 6 is a timing chart which shows the 1T Biphase ATIP timing, the WOBBLE signal and the digitized WOBBLE signal in the optical disc drive according to the present invention.

The WOBBLE signal shown in FIG. 6 is outputted from this split photodiode. As was mentioned above, this WOBBLE signal has a 22.05 kHz frequency signal at the reference rotation speed (1×), and includes a signal obtained by biphase modulating the ATIP information and frequency-modulating it at a carrier frequency of 22.05 kHz.

This WOBBLE signal is inputted into the WOBBLE signal detection circuit 19 where it undergoes digitization.

The digitized WOBBLE signal is then inputted into the WOBBLE servo controller 22.

Figure 7:
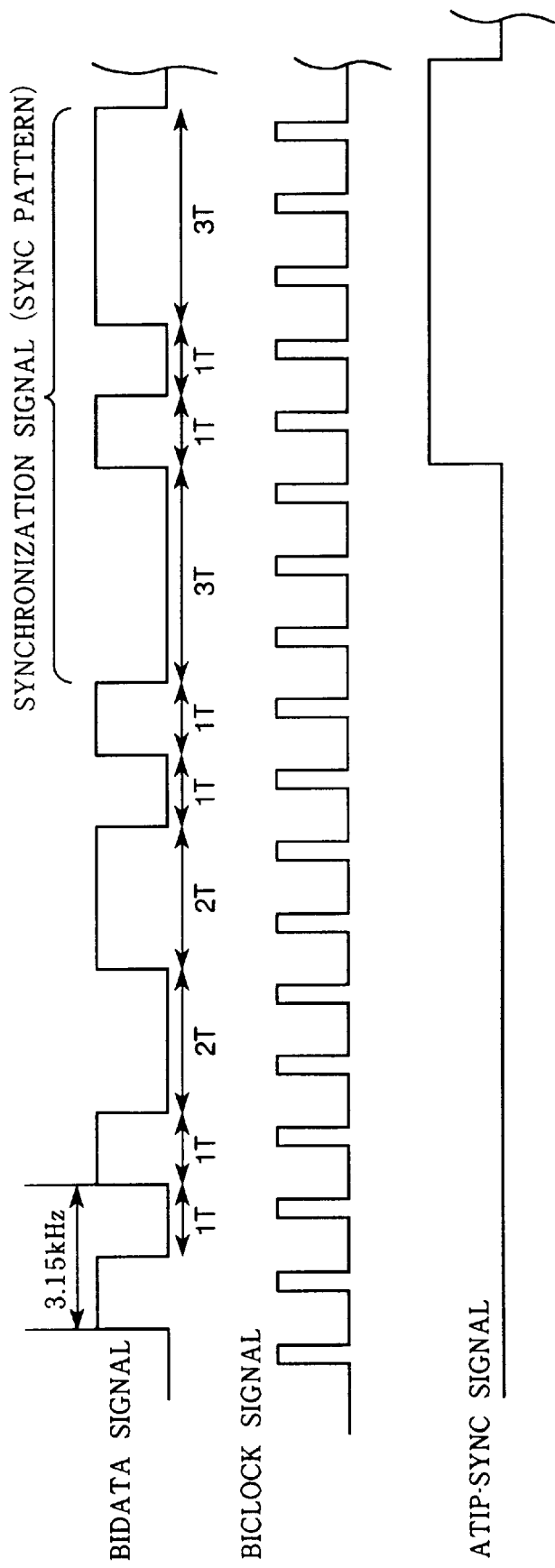
FIG. 7 is a timing chart which shows the BIDATA signal, the BICLOCK signal and the ATIP-SYNC signal in the optical disc drive according to the present invention.

In the WOBBLE servo controller 22, the frequency-modulated ATIP information in the WOBBLE signal is demodulated, and the BIDATA signal (biphase signal) shown in FIG. 7 is obtained. This BIDATA signal is a pulse signal having a length of any one of 1T~3T. Further, by biphase demodulating and then decoding this BIDATA signal, it is possible to obtain the ATIP information.

Further, in a digital PLL circuit (not shown in the drawings) provided in the WOBBLE servo controller 22, a clock is generated based on the BIDATA signal to obtain the BICLOCK signal shown in FIG. 7. This BICLOCK signal is used in timing the decoding of the BIDATA signal (described later).

The BIDATA signal and the BICLOCK signal are respectively inputted into the SYNC signal generating/ATIP decoder 27.

In the SYNC signal generating/ATIP decoder 27, the BIDATA signal is biphase demodulated based on the BICLOCK signal, and the biphase demodulated BIDATA signal is then decoded to obtain the ATIP information. Further, the ATIP-SYNC signal shown in FIG. 7 is also generated.

In this case, as shown in FIG. 7, the ATIP-SYNC signal pulse is generated when the SYNC pattern included in the BIDATA signal is detected. The period of this ATIP-SYNC signal pulse (i.e., the time interval between adjacent pulses) is 1/75 second for the case of the reference rotation speed (1×).

This ATIP-SYNC signal is inputted into the control means 13 and the WOBBLE servo controller 22, respectively.

Further, the decoded ATIP information is inputted into the control means 13. In this way, the control means 13 gets a position on the optical disc 2 (the absolute time) from this ATIP information.

The above-mentioned SUBCODE-SYNC signal from the EFM/CD-ROM encoder control section 24 is inputted into the SYNC signal generating/ATIP decoder 27, after which such SUBCODE-SYNC signal is respectively inputted into the control means 13 and the WOBBLE servo controller 22 from the SYNC signal generating/ATIP decoder 27.

FIG. 8 is a chart showing the frame format of the ATIP frame. As shown in this drawing, the frame format of one ATIP frame is comprised of 4-bits for synchronizing signal (Sync); 8-bits for minutes (Min); 8-bits for seconds (Sec); 8-bits for frames (Frame); and 14-bits for error detection code (CRC: Cyclic Redundancy Code).

In the WOBBLE servo controller 22, the ATIP information of each of the ATIP frames undergoes an error detection process (to determine whether or not the ATIP information is wrong).

In this ATIP information error detection process, if the results of a predetermined operation performed on the data of the Sync, Minutes, Seconds and other data of the ATIP frame match the error detection code (CRC), such a state is defined as a "normal", and if the results don't match the error detection code, such a state is defined as a "ATIP error".

In this case, if it is found that the ATIP information is wrong, namely if an ATIP error is detected, a pulse 51 will be generated in the WOBBLE servo controller 22 as an ATIP error signal, and then it is outputted, as shown in FIG. 4.

The ATIP error signal which is formed from the pulse 51 is inputted into a counter (counting means) 131 provided in the control means 13. Then, the number of the pulses of the ATIP error signal is counted by the counter 131, and the number of the pulses of the ATIP error signal is defined as the number of ATIP errors.

Now, because this error detection process is carried out on the ATIP information for every ATIP frame, a maximum of 75 ATIP errors can occur in 75 ATIP frames (in one second at the reference rotation speed (1×)).

In this connection, a detection means for detecting such ATIP errors is formed from the WOBBLE servo controller 22.

The counted value of the ATIP error is stored in the memory 26 and is also transmitted to the computer 41 via the interface control section 31 to be utilized in examining the optical disc drive 1 (to judge the recording performance of the optical disc drive 1).

The ATIP-SYNC signal inputted into the control means 13 is utilized to the timing of renewal of the ATIP time information.

Further, the ATIP-SYNC signal inputted into the WOBBLE servo controller 22 is used for synchronization with the SUBCODE-SYNC signal.

The SUBCODE-SYNC signal inputted into the control means 13 is used for compensation (interpolation) of the ATIP time information and the measurement of the number of ATIP errors described above.

Further, the SUBCODE-SYNC signal inputted into the WOBBLE servo controller 22 is used as a reference signal for synchronization in the same manner as the ATIP-SYNC signal described above.

In this connection, the synchronization is carried out such that the timing of the SUBCODE-SYNC signal in the EFM data generated when writing data is substantially synchronized with the timing of the ATIP-SYNC signal obtained from the optical disc 2.

Figure 9:
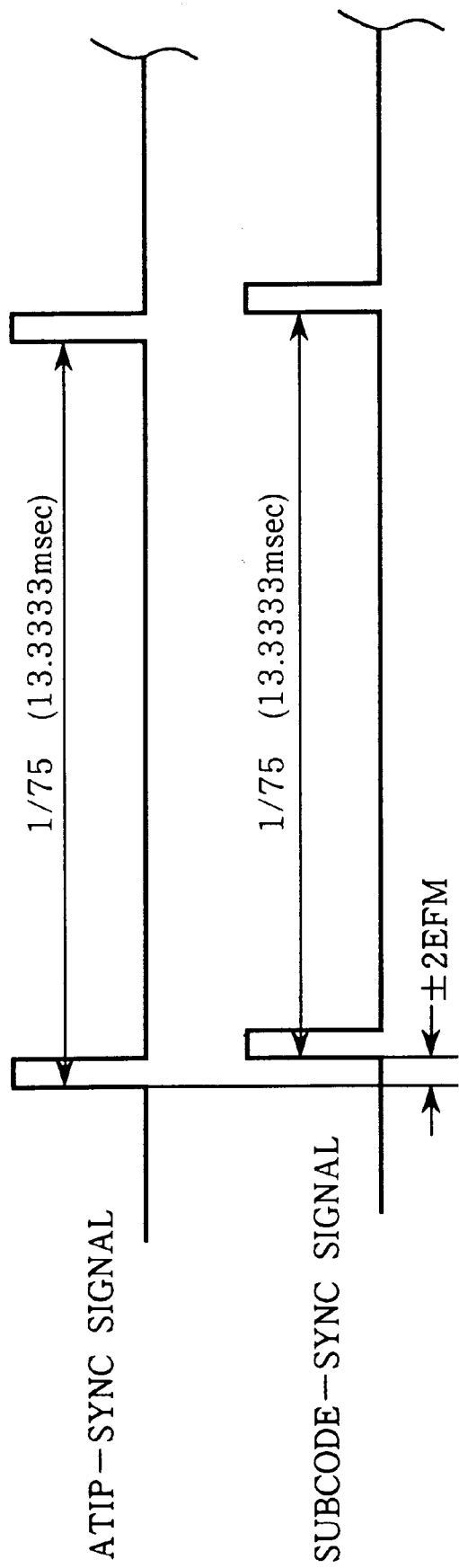
FIG. 9 is a timing chart which shows the ATIP-SYNC signal and the SUBCODE-SYNC signal in the optical disc drive according to the present invention.

As shown in FIG. 9, the SUBCODE-SYNC signal and the ATIP-SYNC signal are normally allowed to shift up to ±2 EFM frames at the respective position on the entire optical disc 2.

(2) Playback

When data (signals) are to be played back (read out) from the optical disc 2, the level of the WRITE POWER signal supplied from the laser control section 14 is maintained at a predetermined DC level corresponding to a read-out output, and in this way, the laser output is maintained at the read-out output level. Normally, the read-out output (the output of the main beam) is set to be equal to or less than 0.7 mW.

Now, when data is being read out from the optical disc 2, laser light at the read-out output is emitted from the laser diode of the optical pick-up 3 onto a predetermined track of the optical disc 2, and the light reflected therefrom is received by the split photodiode of the optical pick-up 3.

Then, electrical currents (voltages) corresponding to the amount of received light are outputted respectively from each light-receiving portion of the split photodiode of the optical pick-up 3, and these currents, namely, each signal (detected signal) is respectively inputted into the HF signal generating circuit 15 and the error signal generating circuit 18.

In the HF signal generating circuit 15, these detection signals undergo addition, subtraction and the like to generate an HF (RF) signal.

This HF signal is an analog signal corresponding to pits and lands formed in the optical disc 2.

As described above, this HF signal is inputted into the HF signal gain switching circuit 16 and then amplified. The amplification factor of the HF signal gain switching circuit 16 is switched by a gain switching signal from the control means 13.

The amplified HF signal (hereafter, referred to as the "HF signal") is respectively inputted into the peak/bottom detection circuit 17 and the CD servo controller 21.

Further, a tracking error (TE) signal (which is described under (3) Focus Control, Tracking Control and Sled Control) is inputted into the peak/bottom detection circuit 17.

Figure 10:
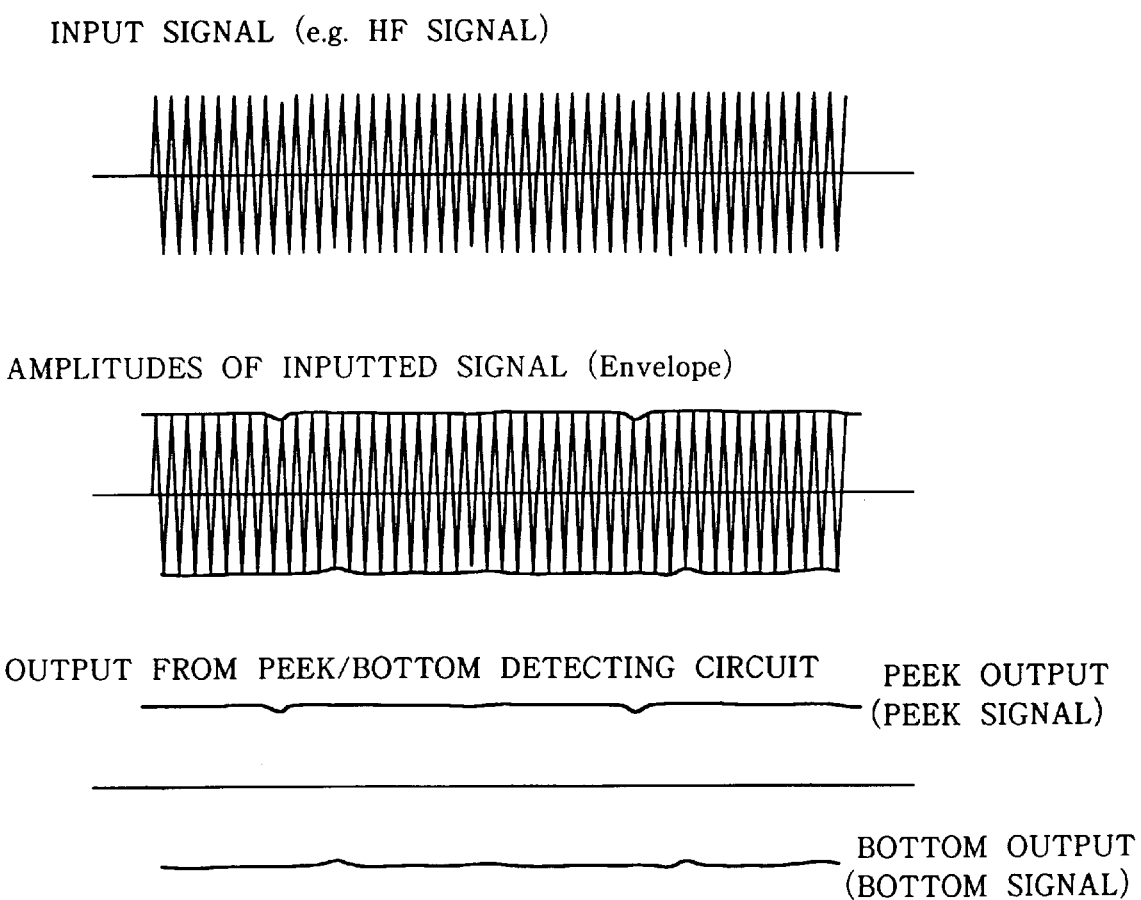
FIG. 10 is a timing chart which shows an input signal inputted to the peek/bottom detecting circuit, the amplitudes of the inputted signal (envelope), and the PEEK signal and the BOTTOM signal in the optical disc drive according to the present invention.

As shown in FIG. 10, in the peak/bottom detection circuit 17, the amplitudes of the inputted signals (envelope), such as the HF signal and the tracking signal, are extracted.

The top and bottom of the amplitude are referred to respectively as the "PEAK" and "BOTTOM", wherein the signal corresponding to the tops of the amplitudes is referred to as "PEEK signal", and the signal corresponding to the bottoms of the amplitudes is referred to as "BOTTOM signal".

The PEEK signal and the BOTTOM signal are respectively inputted into the A/D converter (not shown in the drawings) in the control means 13, and in this A/D converter such signals are converted into digital signals.

These PEAK and BOTTOM signals are used, for example, to measure the amplitude, to adjust the amplitude of the tracking error signal, to calculate the β value in the OPC (Optimum Power Control) procedure, and to determine the presence or absence of the HF signal.

In the CD servo controller 21, the HF signal is digitized and EFM demodulated to obtain an EFM signal. This EFM signal is a signal formed by pulses each having a length (period) corresponding to any one of 3T–1T.

Then, in the CD servo controller 21, an error correction (CIRC error correction) which uses an error correction code referred to as a CIRC (Cross Interleaved Read Solomon Code) is carried out twice on this EFM signal.

In this case, the first CIRC correction is referred to as a C1 error correction, and the second CIRC correction is referred to as the C2 error correction.

Further, the case where error correction can not be carried out by the first CIRC correction, namely the C1 error correction is referred to as a "C1 error", and the case where error correction can not by carried out by the second CIRC correction, namely the C2 error correction is referred to as a "C2 error".

Figure 11:
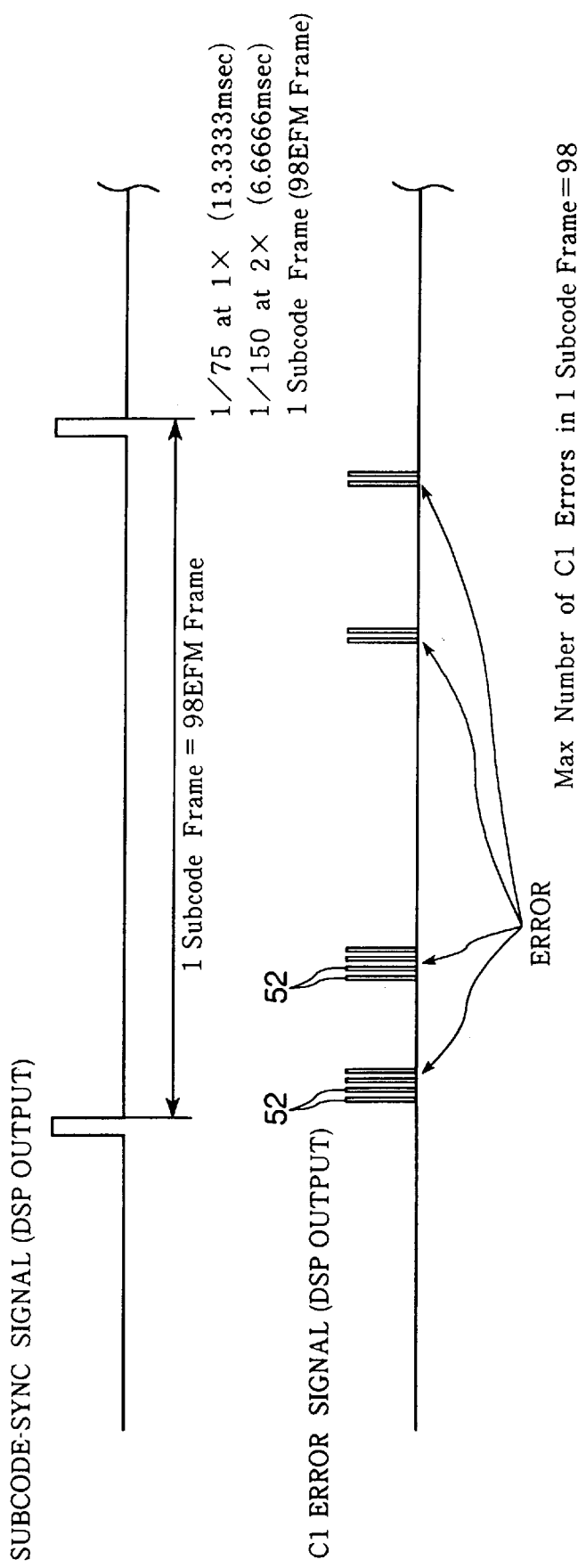
FIG. 11 is a timing chart which shows the SUBCODE-SYNC signal from the CD servo controller and the Cl ERROR signal in the optical disc drive according to the present invention.

As shown in FIG. 11, if a C1 error is detected during the C1 error correction in the CD servo controller 21, a pulse 52 is generated and then it is outputted.

The C1 error signal comprised of the pulses 52 is inputted into the counter 131 of the control means 13. Then, the number of the pulses of the C1 error signal is counted (measured) by the counter 131 as the C1 error.

Now, because one subcode frame is comprised of 98 EFM frames, a maximum number of 7350 C1 and C2 errors can occur respectively in 75 subcode frames (in one second at the reference rotation speed (1×)).

In this regard, it is to be understood that the CD servo controller 21 constitutes a detection means for detecting the C1 error.

The counted value of the C1 errors is stored in the memory 26 and is also transmitted to the computer 41 via the interface control section 31 to be utilized in examining the optical disc drive 1 (to judge the playback performance or the recording/playback performance of the optical disc drive 1).

In the CD servo controller 21, the EFM signal after CIRC error correction has been carried out is decoded (converted) into a predetermined format data, namely, a DATA signal.

Next, a description will be given for a typical case in which audio data (music data) is recorded on an optical disc 2 and its EFM signal is decoded into an audio format DATA signal.

Figure 12:
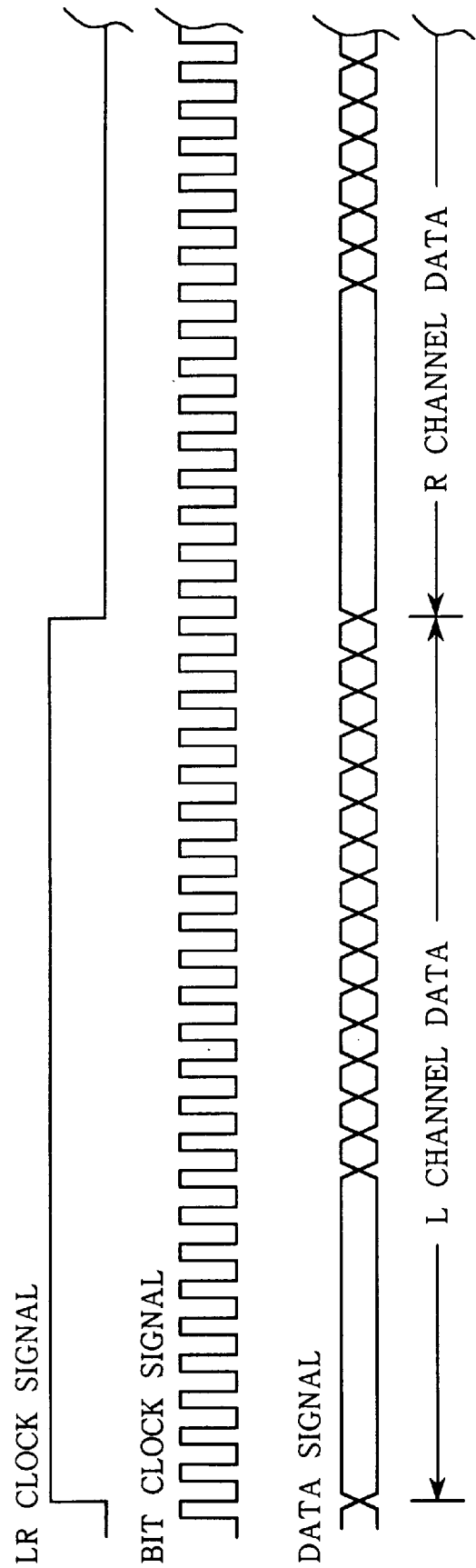
FIG. 12 is a timing chart which shows the DATA signal of an audio format, the LRCLOCK signal and the BITCLOCK signal in the optical disc drive according to the present invention.

In this connection, FIG. 12 is a timing chart showing an audio format DATA signal, an LRCLOCK signal and a BITCLOCK signal.

As shown in this drawing, in the CD servo controller 21, the EFM signal is decoded into a DATA signal comprised of 16-bit L-channel data and 16-bit R-channel data based on a clock signal from the clock 33.

Further, in the CD servo controller 21, the BITCLOCK signal and the LRCLOCK signal are respectively generated based on the clock signal from the clock 33.

This BITCLOCK signal is a serial data transfer clock.

Further, the LRCLOCK signal is a signal for discriminating the L-channel data and the R-channel data in the DATA signal. In this case, the high (H) level of the LRCLOCK signal represents the L-channel data, and the low (L) level of the LRCLOCK signal represents the R-channel.

Now, in the case where normal data other than audio data is recorded on the optical disc 2, the EFM signal thereof is also decoded into a DATA signal comprised of the above-mentioned 16-bit L-channel data and 16-bit R-channel data.

The DATA signal, the LRCLOCK signal and the BITCLOCK signal are respectively inputted into the CD-ROM decoder control section 28.

In the case where error correction information such as ECC (Error Correction Code)/EDC (Error Detecting Code) is recorded on the optical disc 2, error correction is carried out for the DATA signal in the CD-ROM decoder control section 28.

This ECC/EDC is an error correction code used in a CD-ROM MODE 1 format. With this error correction, it is possible to reduce the bit error rate to a degree of $10^{-12}$.

Next, in the CD-ROM decoder control section 28, the DATA signal is decoded into predetermined format data for communication (transmission) based on the clock signal from the clock 35, and then this decoded data is transmitted to the computer 41 via the interface control section 31.

In the computer 41, for example, this decoded data is encoded, and then this encoded data is recorded (copied) into a predetermined recording medium (e.g., a hard disc).

Figure 13:
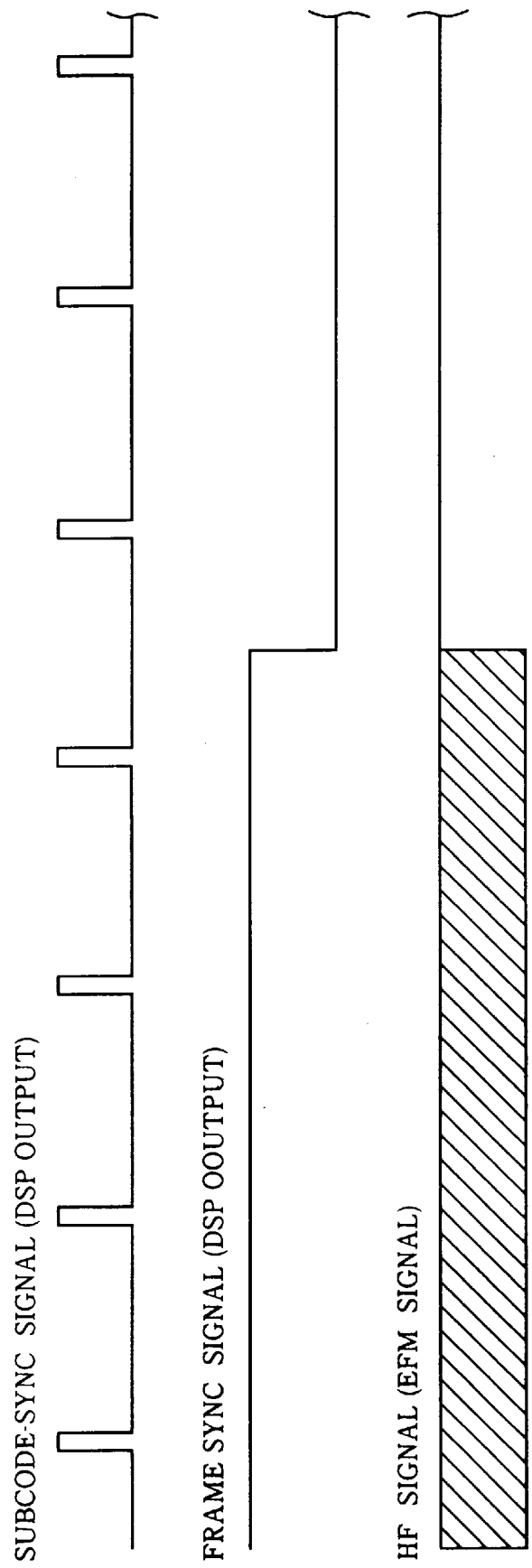
FIG. 13 is a timing chart which shows the SUBCODE-SYNC signal from the CD servo controller, the FRAM SYNC signal, the HF signal (EFM signal) in the optical disc drive according to the present invention.

Further, the FRAME SYNC signal shown in FIG. 13 is generated in the CD servo controller 21.

The level of this FRAME SYNC signal becomes high (H) when the HF signal is inputted into the CD servo controller 21 and the EFM signal is synchronized at a specified period (3T–11T). Further, if no HF signal is inputted (i.e., if there is no synchronization of the EFM signal), the level of the FRAME SYNC signal is switched from a high (H) level to a low (L) level at the respective EFM frame unit.

In this regard, it is to be understood that in the case of the reference rotation speed (1×), the length (period) of one EFM frame is 136 μsec, and 98 EFM frames form one subcode frame.

This FRAME SYNC signal is inputted into the control means 13, and it is used for detecting the termination of the HF signal.

Further, a SUBQ DATA signal is inputted into the control means 13 from the CD servo controller 21.

This SUBQ DATA signal is a signal which represents the Q data in the subcode data.

The subcode includes eight types referred to as P, Q, R, S, T, U, V and W. One EFM frame includes a subcode of one byte in which each of P–W data is recorded with one bit, respectively.

Now, because one subcode frame is comprised of 98 EFM frames, with each EFM frame having one bit for each P–W data, there are a total of 98 bits for each P–W data in one subcode frame. However, because the first two EFM frames are used for the SYNC pattern (synchronization signal), there are actually 96 bits for each P–W data.

Next, FIG. 14 is a chart showing the format of the 96 bits of Q data.

The CONTROL given by Q1–Q4 (4 bits) shown in this drawing are used to discriminate normal data or audio data.

Further, the ADDRESS given by Q5–Q8 (4 bits) represents the contents of the data in Q9–Q80 (72 bits).

Further, the CRC (Cyclic Redundancy Code) in Q81–Q96 (16 bits) is used to detect errors (to judge whether or not the data is wrong).

Furthermore, from this Q data it is possible to obtain information such as the absolute time information on the optical disc 2, the information of the present track, lead-in and lead-out, the music number, and a TOC (Table of Contents) recorded in the lead-in area.

The control means 13 obtains such information from the Q data and then carries out predetermined operations.

Further, the SUBCODE-SYNC signal is inputted into the control means 13 from the CD servo controller 21.

Figure 15:
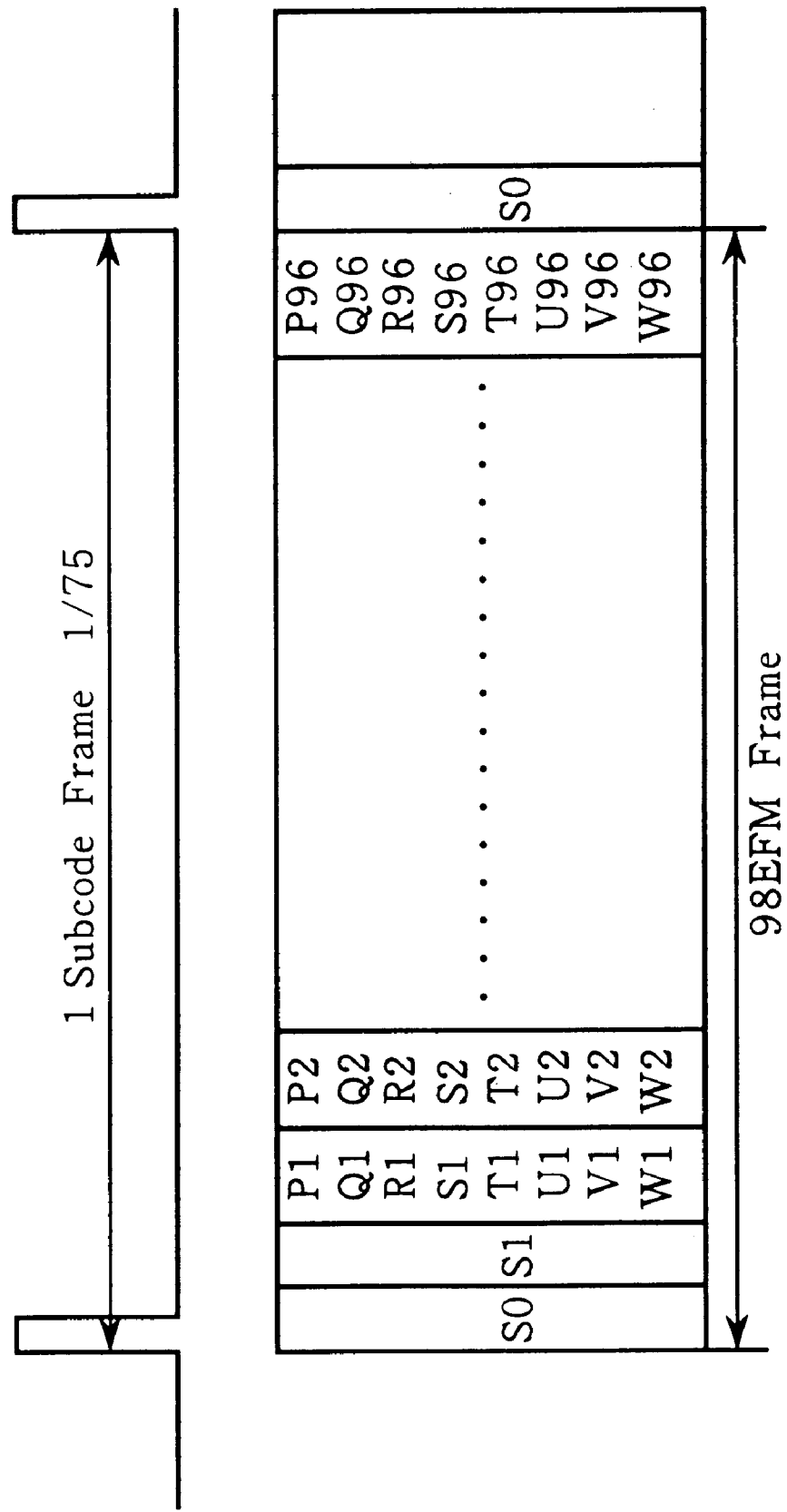
FIG. 15 is a drawing which shows one subcode frame.

Now, as shown in FIG. 15, there are 98 bytes of subcode data in 98 EFM frames, and as mentioned above, the SYNC pattern (synchronization signal) is recorded in the two bytes which form the first two EFM frames, namely, S0 and S1.

If this SYNC pattern is detected, the CD servo controller 21 generates a pulse and then outputs it. Namely, a pulse is generated and outputted for every subcode frame (98 EFM frames). The signal which is formed by this pulse is the SUBCODE-SYNC signal. Further, the SYNC pattern is outputted 75 times every second in the case of the reference rotation speed (1×).

Further, in the CD servo controller 21, the Q data is renewed after the SUBCODE-SYNC signal pulse has been detected. Then, the renewed Q data is read into the control means 13.

(3) Focus Control, Tracking Control and Sled Control

In the error signal generating circuit 18, a focus error (FE) signal, a tracking error (TE) signal and a sled error (SE) signal are respectively generated by carrying out addition and subtraction and the like on the detection signal from the split photodiode.

The focus error signal is a signal which represents the amount of displacement of the objective lens along the rotational axial direction away from the focus position (i.e., the amount of the displacement of the objective lens from the focus position) and the direction thereof.

The tracking error signal is a signal which represents the amount of displacement of the objective lens along a radial direction from the center of the track (Pre-groove) (i.e., the amount of the displacement of the objective lens from the center of the track) and the direction thereof.

Further, the sled error signal is a signal used for sled control, namely, in the sled servo (i.e., the servo for moving the pick-up base of the optical pick-up 3). In other words, the sled error signal is a signal which represents the amount of the displacement of the optical pick-up 3 along a radial direction (i.e., the moving direction of the optical pick-up 3) from the target position (proper position) of the optical pick-up 3 and the direction thereof.

The focus error signal is inputted into the CD servo controller 21. Further, the tracking error signal is also inputted into the CD servo controller 21 and into the peak/bottom detection circuit 17, respectively, as described above.

Further, the sled error signal is also inputted into the CD servo controller 21.

Using these focus error signal, tracking error signal and sled error signal, the optical disc drive 1 carries out focus control, tracking control and sled control for a predetermined track.

During focus control, a focus PWM (Pulse Width Modulation) signal for controlling the driving of the actuator 4 along the rotational axial direction is generated in the CD servo controller 21. This focus PWM signal is a digital signal (continuous pulse).

The focus PWM signal is inputted into the PWM signal smoothing filter 7 from the CD servo controller 21 and undergoes smoothing, namely, the focus PWM signal is converted into a control voltage (control signal), and it is then inputted into the driver 6. Then, based on such control voltage, the driver 6 applies the focus signal (predetermined voltage) to the actuator 4 to drive the actuator 4 in the rotational axial direction (focus direction).

In this case, the CD servo controller 21 adjusts the pulse width (duty ratio) of the focus PWM signal so that the level of the focus error signal becomes zero (i.e., the level is reduced as much as possible), and reverses the code of the focus PWM signal (pulse/minus sign). In this way, the objective lens of the optical pick-up 3 is positioned at the focus position. Namely, the focus servo is engaged.

Further, during tracking control, a tracking PWM signal for controlling the driving of the actuator 4 along the radial direction is generated in the CD servo controller 21. This tracking PWM signal is also a digital signal (continuous pulse).

The tracking PWM signal is inputted into the PWM signal smoothing filter 7 from the CD servo controller 21 and undergoes smoothing, namely, the tracking PWM signal is converted into a control voltage (control signal), and it is then inputted into the driver 6. Then, based on such control voltage, the driver 6 applies the tracking signal (predetermined voltage) to the actuator 4 to drive the actuator 4 in the radial direction (tracking direction).

In this case, the CD servo controller 21 adjusts the pulse width (duty ratio) of the tracking PWM signal so that the level of the tracking error signal becomes zero (namely, the level is reduced as much as possible), and reverses the code of the tracking PWM signal (pulse/minus sign). In this way, the objective lens of the optical pick-up 3 is being positioned at the center of the track (Pre-groove). Namely, the tracking servo is engaged.

Further, during the sled control, a sled PWM signal for controlling the driving of the sled motor 5 is generated in the CD servo controller 21. This sled PWM signal is also a digital signal (continuous pulse).

The sled PWM signal is inputted into the PWM signal smoothing filter 7 from the CD servo controller 21 and undergoes smoothing, namely, the sled PWM signal is converted into a control voltage (control signal), and it is then inputted into the driver 6. Then, based on such control voltage, the driver 6 applies the sled signal (predetermined voltage) to the sled motor 5 to rotationally drive the sled motor 5.

In this case, the CD servo controller 21 adjusts the pulse width (duty ratio) of the sled PWM signal so that the level of the sled error signal becomes zero (i.e., to reduce the level as much as possible), and reverses the code of the sled PWM signal (pulse/minus sign). In this way, the pick-up base of the optical pick-up 3 is positioned at the target position (proper position). Namely, the sled servo is engaged.

Further, in addition to tracking control, the tracking error signal is also used, for example, to control the movement of the optical pick-up 3 toward a predetermined track (target track) of the optical disc 2 (i.e., to control track jump operations).

(4) Rotation Number Control (Rotation Speed Control)

In the optical disc drive, the rotation number (rotation speed) of the spindle motor 8 is controlled during recording or playback so that the linear velocity becomes constant. The methods of controlling this rotation number include a method using a WOBBLE PWM (Pulse Width Modulation) signal, namely, a spindle servo (WOBBLE servo) which uses the WOBBLE signal; a method using an FG PWM signal, namely, a spindle servo (FG servo) which uses an FG signal; and a method using an EFM PWM signal, namely, a spindle servo (EFM servo) which uses the EFM signal. These will be described below in the order mentioned above.

The WOBBLE PWM signal is a signal for controlling the spindle motor, and it is generated by the WOBBLE servo controller 22. The WOBBLE PWM signal is a digital signal (continuous pulse) having a level of 0–5V.

This WOBBLE PWM signal is inputted into the PWM signal smoothing filter 12 from the WOBBLE servo controller 22 and undergoes smoothing, namely, the WOBBLE PWM signal is converted into a control voltage (control signal), and it is then inputted into the driver 11. Then, based on such control voltage, the driver 11 rotationally drives the spindle motor 8.

In this case, the WOBBLE servo controller 22 adjusts the pulse width (duty ratio) of the WOBBLE PWM signal so that the frequency (period) of the WOBBLE signal becomes the target value (e.g., 22.05 kHz at the reference rotation speed (1×)). In this way, the spindle servo is engaged to set the rotation number (rotation speed) of the spindle motor 8 at the target value.

The FG PWM signal is a signal for controlling the spindle motor, and it is generated by the control means 13. The FG PWM signal is a digital signal having a level of 0–5V (continuous pulse).

This FG PWM signal is inputted into the PWM signal smoothing filter 12 from the control means 13 and undergoes smoothing, namely, the FG PWM signal is converted into a control voltage (control signal), and it is then inputted into the driver 11. Then, based on such control voltage, the driver 11 rotationally drives the spindle motor 8.

On the other hand, a FG (Frequency Generator) signal corresponding to the rotation number (rotation speed) of the spindle motor 8 is outputted from the Hall element 9. This FG signal is digitized by the FG signal digitization circuit 23 and then such a digitized signal is inputted into a frequency measurement (period measurement) section (not shown in the drawings) of the control means 13.

In the frequency measurement section of the control means 13, the frequency (period) of the FG signal is measured based on the clock signal from the clock 32. Then, the control means 13 adjusts the pulse width (duty ratio) of the FG PWM signal so that the frequency (period) of the FG signal becomes the target value. In this way, the spindle servo is engaged to set the rotation number (rotation speed) of the spindle motor 8 at the target value.

The EFM PWM signal is a signal for controlling the spindle motor, and it is generated by the CD servo controller 21. The EFM PWM signal is a digital signal having a level of 0–5V level (continuous pulse).

This EFM PWM signal is inputted into the PWM signal smoothing filter 12 from the CD servo controller 21 and undergoes smoothing, namely, the EFM PWM signal is converted into a control voltage (control signal), and it is then inputted into the driver 11. Then, based on such control voltage, the driver 11 rotationally drives the spindle motor 8.

In this case, the CD servo controller 21 adjusts the pulse width (duty ratio) of the EFM signal so that the EFM signal, that is a period of a predetermined pulse selected from the 3T–11T period pulses becomes the target value in anywhere on the optical disc. In this way, the spindle servo is engaged to set the rotation number (rotation speed) of the spindle motor 8 at the target value.

In carrying out the spindle servo, any one of the methods mentioned above can be selectively used.

Hereinbelow, a description is made with regard to the method of examining the optical disc drive 1, wherein a method of examining a playback performance or a recording and playback performance of the optical disc drive 1 and a method of examining a recording performance of the optical disc drive 1 will be explained in this order.

When the playback performance or recording and playback performance of the optical disc drive 1 is to be examined, a reference optical disc (an optical disc having essentially no defect) is loaded to the optical disc drive 1 to measure the number of C1 errors.

In order to examine the playback performance, a reference optical disc in which data is previously recorded is used, and such data is read out from the optical disc to count the number of C1 errors.

Alternatively, in order to examine the recording performance, that is to examine as to whether it is possible to correctly write data onto an optical disc, data is first written in an optical reference disc in which no data is recorded, and then the written data is read out from the optical disc to count the number of C1 errors.

Hereinbelow, operation of the control means 13 upon examining the optical disc drive 1 will be described based on FIG. 16.

Figure 16:
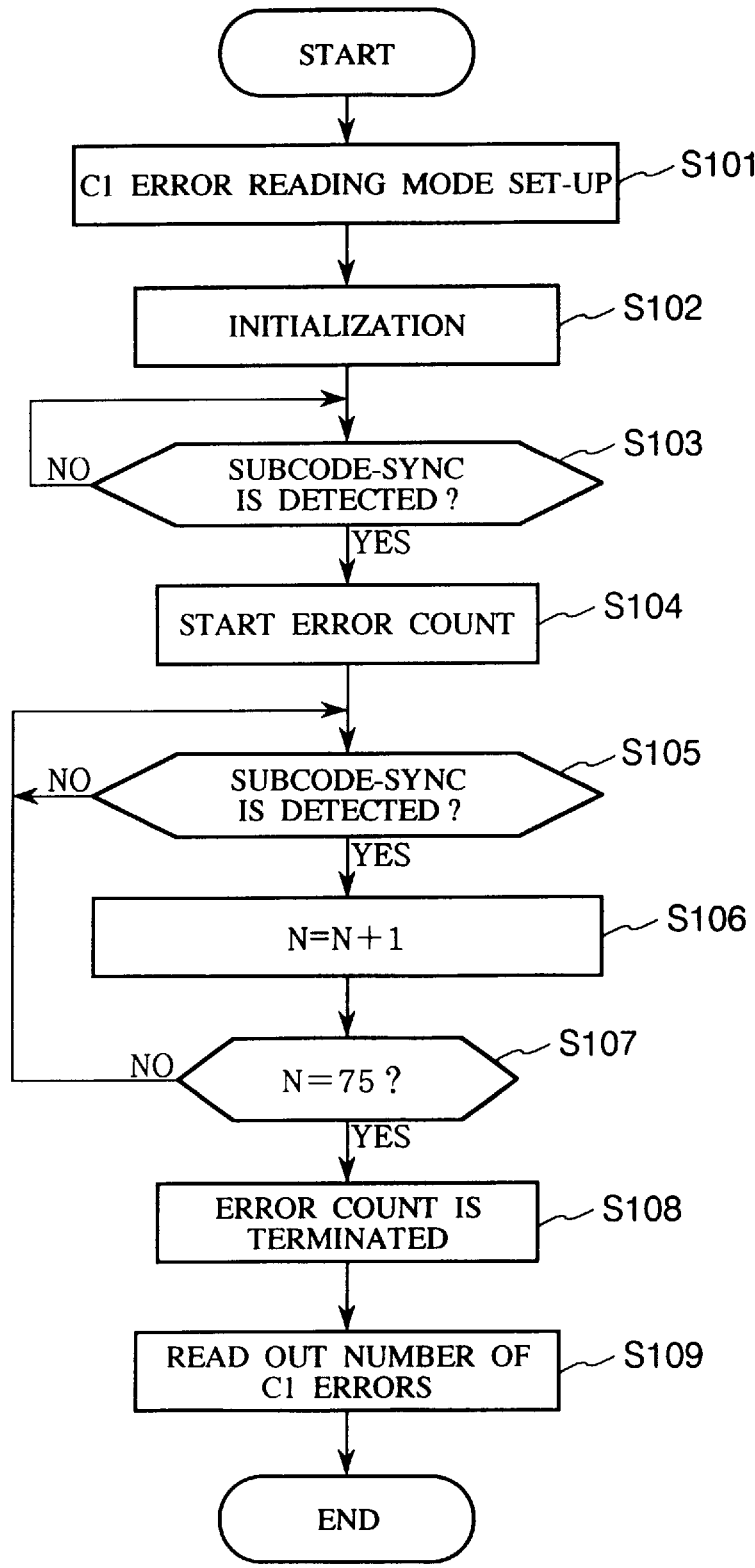
FIG. 16 is a flow chart which shows the operation of the control means in the optical disc drive according to the present invention.

FIG. 16 is a flow chart showing the operation of the control means 13.

When the control means 13 receives a command to count the number of C1 errors, the program shown in FIG. 16 (a routine for counting the number of C1 errors) is executed.

First, a C1 error counting mode is set up (Step 101). Then, an initialization is carried out (Step 102). In this initialization step, the counter value of the counter 131 incorporated in the control means 13 is set to be zero, and the counter value N of a counter for counting SUBCODE SYNC (not shown in the drawing) is also set to be zero.

Next, a determination is made as to whether or not a SUBCODE-SYNC signal from the CD servo controller 21 is detected (Step 103). When it is determined that the SUBCODE-SYNC signal is detected, the counter 131 is started up to begin the count of the number of C1 errors (Step 104).

Then, a determination is made as to whether or not the next SUBCODE-SYNC signal from the CD servo controller 21 is detected (Step 105). When it is determined that the next SUBCODE-SYNC signal is detected, the counter value of the counter for counting the SUBCODE-SYNC is incremented by one (that is, N=N+1) (Step 106).

Next, a determination is made as to whether N is 75 or not (Step 107). When it is determined that N is equal to or less than 74 at Step 107, the program returns to Step 105 and the steps after Step 105 are executed again.

On the other hand, when it is determined that N is 75 at Step 107, the counter 131 is stopped to terminate the C1 error count (Step 108).

The number of C1 errors (counted value) per 75 subcode frames (in one second at the reference rotation speed (1×)), that is the number of C1 errors per 7350 (98×75) EFM Frames is obtained by the steps from Step 104 to Step 108. In other word, the counted value of the counter 131 means the number of C1 errors per 75 subcode frames.

Next, the counted value of the counter 131 is read out, and it is stored in the memory 26 (Step 109). The program for counting the number of C1 errors is ended by this Step.

Then, the number of C1 errors is read out from the memory 26, and it is transmitted to the computer as a message responding to the command. The computer 41 displays the number of C1 errors on the monitor 44.

In the examining method described above, assuming that the reading out of the data from the reference disc would be carried out under the rotation speed of six times (6×) for example, it is determined that the playback performance of the optical disc drive 1 is normal, when the number of C1 errors per 75 subcode frames (in ⅙ second at the rotation speed of six times (6×)) is equal to or less than 20. On the other hand, it is determined that the playback performance of the optical disc 1 is abnormal, when the number of C1 errors exceeds 20.

As described above, according to the optical disc drive 1, since the counter 131 for counting the number of C1 errors is incorporated therein, it is possible to count the number of C1 errors easily and reliably without connecting a separate external counter for counting the number of C1 errors and without disassembling the optical disc drive 1 when it is to be repaired.

In particular, when the number of C1 errors is measured on the manufacturing process, it is not necessary to install any error rate counter for counting the number of C1 errors on the assembly line, thereby enabling to count the number of C1 errors without increasing the equipments of the assembly line.

Further, in the case where the recording performance of the optical disc drive 1 (that is, a WOBBLE signal reproducing capability) is to be examined, a reference optical disc (an optical disc having essentially no defect) is loaded to the optical disc drive 1 to count the number of ATIP errors.

In this case, no data is recorded to the reference optical disc, and the number of ATIP errors is measured by counting the number of ATIP errors from the reference disc.

Alternatively, it is also possible to previously write predetermined data in a reference optical disc in which no data is recorded, and then the number of ATIP errors can be measured by counting the number of ATIP errors from the reference disc.

Hereinbelow, operation of the control means 13 during the examination for the optical disc drive 1 will be described based on FIG. 17.

Figure 17:
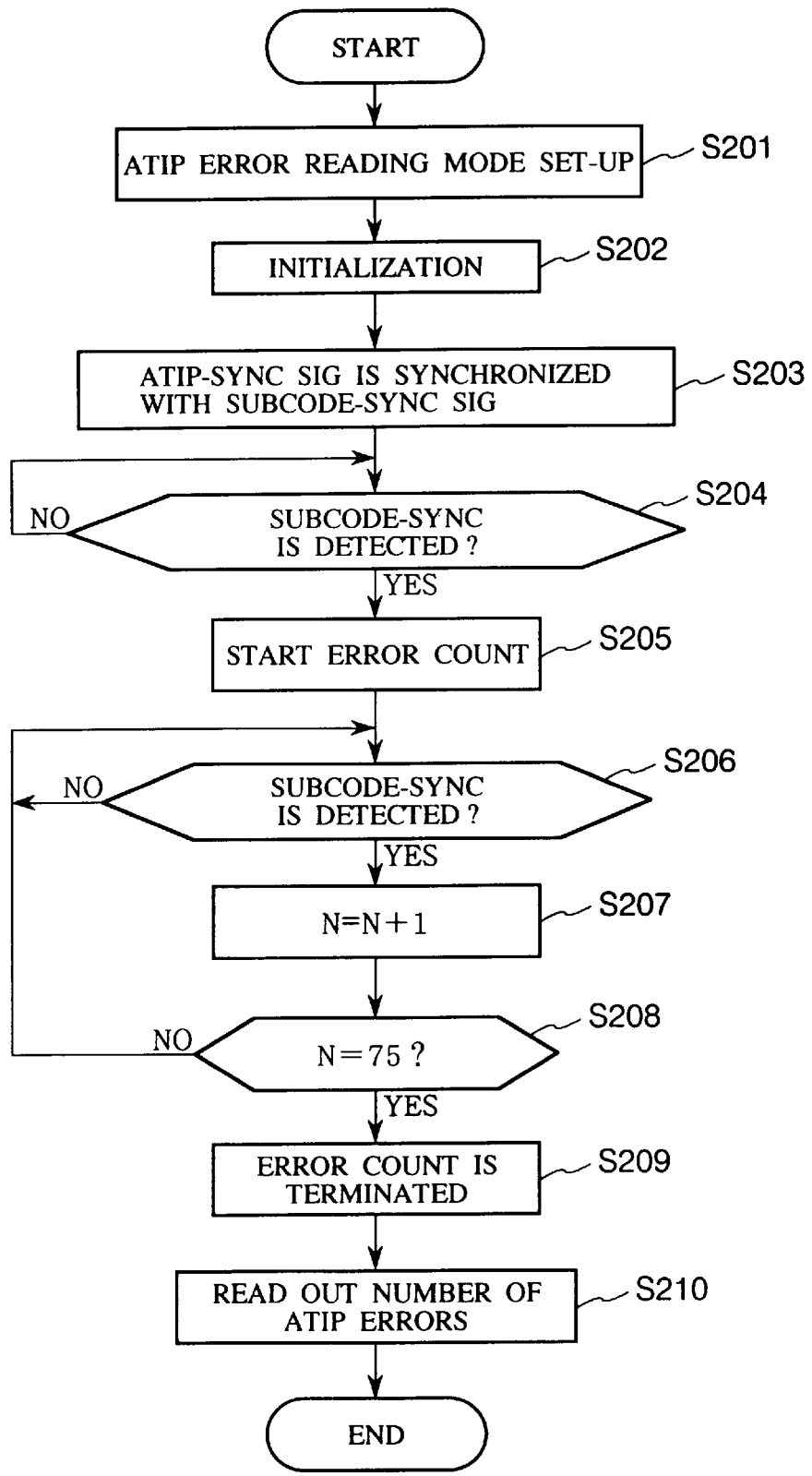
FIG. 17 is another flow chart which shows the operation of the control means in the optical disc drive according to the present invention.

FIG. 17 is a flow chart which shows the operation of the control means 13.

When the control means 13 receives a command to count the number of ATIP errors, the program shown in FIG. 16 (a routine for counting the number of ATIP errors) is executed.

First, an ATIP error counting mode is set up (Step 201). Then, an initialization is carried out (Step 202). In this initialization step, the counter value of the counter 131 incorporated in the control means 13 is set to be zero, and the counter value N of a counter for counting SUBCODE-SYNC (not shown in the drawing) is also set to be zero.

Next, the SUBCODE-SYNC signal from the SYNC signal generating/ATIP decoder 27 (which is generated by the EFM/CDROM encoder control section 24) is synchronized with the ATIP-SYNC signal from the SYNC signal generating/ATIP decoder 27 (Step 203). In this connection, it is to be noted that, as described above, the SUBCODE-SYNC signal from the SYNC signal generating/ATIP decoder 27 is generated by the EFM/CDROM encoder control section 24 by dividing the clock signal from the clock 34.

In this Step 203, a command for synchronization is produced as shown in FIG. 18. When this command is received, the SUBCODE-SYNC signal becomes synchronized with the ATIP-SYNC signal in the SYNC signal generating/ATIP decoder 27, and thereafter such synchronization of the SUBCODE-SYNC signal and the ATIP-SYNC signal is being continued.

Next, a determination is made as to whether or not the SUBCODE-SYNC signal from the SYNC signal generating/ATIP decoder 27 is detected (Step 204). When it is determined that the SUBCODE-SYNC signal is detected, the counter 131 is started up to begin the count of the number of ATIP errors (Step 205).

Then, a determination is made as to whether or not the next SUBCODE-SYNC signal from the SYNC signal generating/ATIP decoder 27 is detected (Step 206). When it is determined that the next SUBCODE-SYNC signal is detected, the counter value of the counter for counting the SUBCODE-SYNC is incremented by one (that is, N=N+1) (Step 207).

Next, a determination is made as to whether N is 75 or not (Step 208). When it is determined that N is equal to or less than 74 at Step 206, the program returns to Step 206 and the steps after Step 206 are executed again.

On the other hand, when it is determined that N is 75 at Step 208, the counter 131 is stopped to terminate the ATIP error count (Step 209).

The number of ATIP errors (counted value) per 75 subcode frames (in one second at the reference rotation speed (1×)) is obtained by the steps from Step 205 to Step 209. In other word, the counted value of the counter 131 means the number of ATIP errors per 75 subcode frames.

Next, the counted value of the counter 131 is read out, and it is stored in the memory 26 (Step 210). The program for counting the number of ATIP errors is ended by this Step.

Then, the number of ATIP errors is read out from the memory 26, and it is transmitted to the computer as a message responding to the command. The computer 41 displays the number of ATIP errors on the monitor 44.

In the examining method described above, assuming that the reading our of the data from the reference disc would be carried out under the reference rotation speed (1x) for example, it is determined that the recording performance of the optical disc drive 1 is normal when the number of ATIP errors per 75 subcode frames (in one second at the reference rotation speed (1x)) is zero, while it is determined that the recording performance of the optical disc 1 is abnormal when the number of ATIP errors is equal to or larger than 1.

As described above, in this embodiment, the sampling time (one second) for counting the number of ATIP errors is measured using the SUBCODE-SYNC signal produced by the clock in the optical disc drive 1, after the SUBCODE-SYNC signal has been synchronized with the ATIP-SYNC signal. This is because in the case of the ATIP-SYNC there is a case that such a signal can not be acquired from the disc due to its defect or the like.

As described above, according to the optical disc drive 1, since the counter 131 for counting the number of ATIP errors is incorporated therein, it is possible to count the number of ATIP errors easily and reliably without connecting a separate external error rate counter for counting the number of ATIP errors and without disassembling the optical disc drive 1 when it is to be repaired.

In particular, when the number of ATIP errors is measured on the manufacturing process, it is not necessary to install any error rate counter for counting the number of ATIP errors on the assembly line, thereby enabling to count the number of ATIP errors without increasing the equipments in the assembly line.

Furthermore, it should be noted that application of the present invention is not limited to CD-R drives described above. The present invention can be applied to other various optical disc drives for recording and playing back optical discs having a pre-groove such as CD-RW, DVD-R, DVD-RAM or the like.

Finally, it should be also noted that even though the optical disc drive of the present invention was described with reference to the embodiment shown in the drawings, the present invention is not limited thereto, and any additions or changes may be made without departing from the scope of the following claims.

What is claimed is:

1. An optical disc drive for recording and playing back a recordable-type optical disc, comprising:

a driving mechanism for rotating the optical disc;

an optical pick-up for writing and reading data to and from the optical disc;

signal processing means for processing signals read out from the optical disc by means of the optical pick-up;

control means for controlling at least the driving mechanism, the optical pick-up and the signal processing means;

detecting means for detecting an ATIP error; and counting means for counting the number of ATIP errors.

2. The optical disc drive as claimed in claim 1, further comprising a memory for storing the counted value of the ATIP errors.

3. The optical disc drive as claimed in claim 1, wherein the detecting means is provided in the signal processing means.

4. The optical disc drive as claimed in claim 1, wherein the counting means is provided in the control means.

5. The optical disc drive as claimed in claim 1, further comprising transmitting means for transmitting the counted value of the ATIP errors or information obtained from the counted value to a computer.

6. The optical disc drive as claimed in claim 1, wherein the optical disc has a pre-groove for generating a first synchronization signal and the optical disc drive has means for generating a second synchronization signal, in which the counting means counts the number of ATIP errors caused in a predetermined time based on the second synchronization signal after the second synchronization signal has been synchronized with the first synchronization signal.

7. The optical disc drive as claimed in claim 6, wherein the second synchronization signal generating means includes a clock provided in the optical disc drive.

8. A method of examining an optical disc drive for recording and playing back a recordable-type optical disc, the method comprising the steps of:

preparing an optical disc drive having detecting means for detecting an ATIP error and counting means for counting the number of ATIP errors;

loading a reference optical disc which has substantially no defect to the optical disc drive;

driving the optical disc;

counting the number of ATIP errors by means of the detecting means and the counting means of the optical disc drive;

examining the recording performance of the optical disc drive based on the counted number of the detected ATIP errors.

9. The method of examining an optical disc drive as claimed in claim 8, wherein the optical disc drive is connected to a computer having a monitor, and the counted number of the detected ATIP errors is displayed on the monitor.

10. The method of examining the optical disc drive as claimed in claim 9, wherein the optical disc has a pre-groove for generating a first synchronization signal and the optical disc drive has means for generating a second synchronization signal, in which the counting means counts the number of ATIP errors caused in a predetermined time based on the second synchronization signal after the second synchronization signal has been synchronized with the first synchronization signal.

11. The optical disc drive as claimed in claim 10, wherein the second synchronization signal generating means includes a clock provided in the optical disc drive.

* * * * *

UNITED STATES PATENT AND TRADEMARK OFFICE
CERTIFICATE OF CORRECTION

PATENT NO. : 6,141,306
DATED : October 31, 2000
INVENTOR(S) : Andoh

It is certified that error appears in the above-identified patent and that said Letters Patent is hereby corrected as shown below:

Title page,
"METHODS" should read "METHOD"

Column 3,
Line 29, change "peek/bottom" to read -- peak/bottom --

Column 4,
Paragraphs 7-8, should be combined to form one paragraph

Column 5,
Line 20, change "An" to read -- A --

Column 12,
Line 67, change "pulse/minus" to read -- plus/minus --

Column 13,
Line 20, change "pulse/minus" to read -- plus/minus --

Column 16,
Lines 47, and 51, "75" should not be BOLDFACE
Line 67, change "our" to read -- out --

Signed and Sealed this

Fourth Day of December, 2001

Attest:

*Nicholas P. Godici*

NICHOLAS P. GODICI
*Attesting Officer*     *Acting Director of the United States Patent and Trademark Office*